United States Patent Office

2,798,814
Patented July 9, 1957

---

2,798,814

FROZEN FOOD PATTIES AND METHOD OF PREPARING SAME

Eugene J. Rivoche, Washington, D. C.

No Drawing. Application January 11, 1957,
Serial No. 633,533

17 Claims. (Cl. 99—192)

---

This invention relates to food products and to methods for the preparation thereof, and more particularly to frozen food products of the patty or steak type. The new frozen food product is a frozen steak-like or patty-like product composed of particles of food materials such as meat, seafood, fish, vegetables, fruits, and the like, or any desired combination or mixtures of these food materials. The food materials in the frozen steak or patty may be either raw or partially cooked, or in some instances, if desired, may be fully cooked. The product is adapted to be rapidly heated on a pan or griddle, on a broiler rack, or in deep fat, without preliminary thawing, and provides an exceptionally tasty and juicy cooked patty. A distinguishing characteristic of the new product is that once cooked the product steak or patty has a consistency different from that obtained from cooking of ground food products in the manner usually prepared. The individual food particles until cooked are held together by a frozen solution substantially filling the voids between the particles and after cooking by a substantially invisible, highly concentrated gel framework or fibrous network resulting from transitory gel formation during the cooking operation. The product of the invention is smoother and juicier than the usual hamburger, can be provided in any desired hardness and texture, and may be made to resemble more nearly a non-ground steak than heretofore has been possible. While it is contemplated that the new product will remain frozen until cooked, it may, if desired, be thawed and refrozen again without substantial harm to the quality of the product, or, in some instances, even cooked without refreezing.

An object of the invention is to provide a frozen food product which can be quickly cooked and which after cooking retains the flavor, natural juices, and taste characteristics of a fresh food.

Another object of the invention is to provide a method for preparing frozen food patties of food particles which ordinarily do not sufficiently adhere together to form a cohesive mass, in such manner that the patties do not disintegrate while cooking or serving.

Another object of the invention is to provide a food product which will withstand deep-freezing and which will not deteriorate upon thawing and refreezing.

Another object of the invention is to provide a method for producing frozen food patties whereby food particles of almost any type of food material and combinations of different food materials can be made into patty form.

Another object of the invention is to provide a method for producing a food product which may be cooked without decreasing the moisture content of the resulting cooked product below that present in the natural food materials from which the product is produced.

Another object of the invention is to provide a method for producing a food product wherein a food-particle-supporting frame work is formed during the cooking operation.

Another object of the invention is to provide a frozen food product wherein the cooking characteristics and the characteristics of the product after cooking may be readily predetermined and controlled.

Another object of the invention is to provide a frozen food product of patty type which can be cooked on a pan, griddle, or the like, in the manner of the usual hamburger or fishcake, but which requires no greasing of the pan prior to cooking.

Another object of the invention is to provide a frozen food patty which, when subjected to cooking temperature, loses its moisture content slowly, thereby preventing burning or extensive drying, and, at the same time, permitting sufficient cooking time to thoroughly cook the food particles therein.

These and other objects of the invention which will become apparent from the ensuing description, are accomplished through the use of aqueous solutions containing small quantities of certain edible cellulose gums which have the property of remaining fluid at normal temperatures as for example between 32° and 100° F., but which form gels upon an increase in temperature as, for example, above 100° F. or more. In accordance with the invention, an aqueous solution containing a small percentage of such edible gum can be incorporated with food particles in an amount of up to 100% by weight and more of the food particles, the resulting mass can then be frozen and sliced into patty-like pieces which may then be cooked while frozen to provide a tasty food patty of pleasing appearance and consistency.

Edible gums which have been found to impart the desired properties to the aqueous solutions contemplated by the invention are the cellulose methyl ethers marketed under the trade name of "Methocel." Chemically, "Methocel" is a long chain cellulosic polymer having a methoxyl content of about 27.5 to 32%. The "H. G." or high-gel grade of "Methocel," chemically is hydroxypropyl methylcellulose. These cellulose, hereinafter also referred to generically as methyl cellulose, products should not be confused with other cellulose gums, such as carboxy-methyl cellulose, which have entirely different characteristics and are totally unsuitable for the purposes of this invention. Unlike solutions of other gel-forming materials such as gelatin, alginates, pectinates, and the like, which provide harder gels as their temperature is lowered, solutions of the cellulose methyl ethers contemplated by the invention remain fluid until frozen and do not begin gel formation until heated. The gel-forming properties of these cellulose ethers are unaffected by freezing and thawing.

"Methocel" products are commercially available in various grades ranging in viscosity from 10 to 7000 centipoises in 2% water solution at 68° F. "Methocel" U. S. P. grade, H. G. 65 grade, H. G. 60 grade, and H. G. 90 grade have been found to be satisfactory. Each of these grades of cellulose ether is available in varying viscosity ranges and their aqueous solutions, while having the common characteristic of forming gels at elevated temperatures, begin gel formation at somewhat different temperatures. Thus, the U. S. P. grade may begin to form a gel at about 115° F. in 2% solution, whereas the H. G. 90 grade does not begin the gel formation until about 190° F. in the same solution concentration. In general, it is desirable to use the higher-temperature gel grades for food patties which require longer cooking times. One skilled in the art may readily determine the best grade and type of "Methocel" for the particular type of food particles used in the product.

It has been found advantageous in some instances to mix the lower temperature gel-forming grades with the higher temperature gel-forming grades to obtain gel-forming characteristics intermediate between the two. "Methocel" products of the same grade but of different viscosity characteristics may also be mixed together to provide a gel of a selected characteristic. Thus, for example, a satisfactory solution can be obtained by mixing "Methocel" H. G. 65 having a viscosity characteristic of 15 centipoises in 2% solution with a "Methocel" of the same grade having a viscosity characteristic of 4000 centipoises in 2% solution. Any desired proportions of the two viscosity types may be mixed—depending upon the viscosity desired in the final solution and the consistency and cooking characteristics desired in the product food patty.

The characteristics of the final food products and the desired cooking times may be regulated by varying the quantity and/or concentration of "Methocel" solution. In general, larger quantities of solution are used with food products requiring longer cooking times such as the raw meats and raw vegetables. As water evaporates from the solution during cooking, it becomes more concentrated and the gel formed due to the temperature rise becomes increasingly hard. "Methocel" solutions, in general, do not form gels in concentrations of less than about 2% even upon heating to boiling temperature. The present invention therefore, if weak solutions are used, relies upon evaporation of water during cooking to concentrate the solution and form a transitory gel which substantially disappears on further cooking. In the final, cooked product it is substantially impossible to detect the presence of a gel or of the gel-forming material. The small quantity of cellulosic material is tasteless and does not alter the food flavors.

In accordance with the invention, the ground or shredded food, such as hamburger meat, beef, veal, pork, shredded chicken, turkey, fish, seafood, vegetables, or the like, is mixed with an aqueous solution of the selected cellulose methyl ether. The amount of solution may be varied widely, for example, from about 10% by weight of the shredded or ground food up to 100% by weight or more. The concentration of the cellulose ether in the solution is very small, and generally from about 0.1% to 2.0% has been found adequate. The maximum concentrations that will provide workable solutions depends upon the viscosity type of cellulose ether employed. The lower the viscosity type of methyl cellulose ether that is used, the higher the solution concentration may be and still provide a workable solution. Thus, with a viscosity type of 10 to 100 cps., solution concentrations up to 8% have been found workable, while with a viscosity type of 4000 cps., and above, the solution concentration should generally be no higher than about 3%. By using weaker solution concentrations, larger quantities of solution can be employed without affecting the texture and taste of the resulting cooked product. Generally, where larger quantities of solution are desirable, the concentration of such solutions should be on the weaker side, the large quantity of low concentration providing the necessary quantity of methyl cellulose ether molecules to form the desired supporting gel framework while cooking. The optimum quantity of solution and optimum solution concentration for each viscosity type of methyl cellulose ether and for each specific usage may readily be determined by one skilled in the art, it being borne in mind that it is desirable to use as little cellulose methyl ether as possible so as to have the minimum amount of cellulosic material in the final cooked product.

For certain raw ground or shredded foods that have some natural tendency to adhere together, such as ground raw beef, shredded raw shrimp, and the like, solution concentrations in the lower portion of the above-recited range may be used, i. e. as low as 0.1–.5%, whereas with other raw foods such as chicken, turkey, and most vegetables as well as with almost all cooked foods, slightly higher solution concentrations may be necessary, i. e. 0.66% and above. In general, where solution concentrations below 2% are used, the amount of cellulose ether is not sufficient to increase the viscosity of the solution to such an extent as to hold the food particles together, and at mixing temperatures the solution is in substantially fluid condition.

In most instances prior to freezing, the mass resulting after the mixing operation does not have sufficient rigidity to maintain its shape, or is of a rather sticky consistency, and accordingly cannot be formed directly into patties or cakes. With some food particles, such as ground beef or hamburger, it is possible to use solutions containing selected amounts of certain viscosity types of "Methocel" and form the resulting mass directly into patties. The present invention, however, takes advantage of a freezing step before cooking and preferably before patty formation. If the patties are formed directly from the mass without freezing, such patties are then frozen prior to being distributed and cooked.

All-meat or all-vegetable products may be produced, the final product having an extremely low proportion of the cellulosic additive. For example, in a product formed by adding 50% by weight of a 1% solution of "Methocel" to meat, the frozen patty would contain only ⅓ of 1%, and the cooked product, if the entire added solution is evaporated while cooking, would contain no more than ½ of 1%.

In a product formed by adding 20% by weight of an 8% solution of "Methocel" to food materials, the frozen product would contain only 1⅓% of "Methocel" and the cooked product only 1.6% where the solution is totally evaporated.

Where ground or shredded meat, fish, or seafood is utilized for admixture with the methyl cellulose solution, shredded or whole vegetables may be further admixed with the mass so as to form a meat-vegetable product after freezing. Thus, for example, ground or shredded meat may be admixed with about 10 to 50% by weight of "Methocel" solution and, to this mixture may be added 10 to 50% by weight of whole, chopped, or shredded vegetables based on the weight of the meat. Whole peas, cut corn, shredded celery, carrots, beans, cabbage, spinach, beets, and the like have been satisfactorily employed. It is an important feature of the invention that the "Methocel" solution provides sufficient moisture to enable raw products to be thoroughly steamed or cooked while at the same time providing, through the formation of a gel while cooking, a framework holding the particles together in the cooking medium. It has been found that water alone or solutions of other types of cellulose gums cannot accomplish this function.

After the mass has been mixed, it may be shaped in any desired manner and frozen, whereupon the frozen mass is sliced into patties or steaks of the desired thickness. A convenient way of forming and freezing the mixture is by placing it in a conventional stuffing machine and forcing it under low pressure into fiber or metal molds of the desired shape, or into natural or synthetic casings. By proper selection of the mold, the product may be made either as a square loaf, cylindrical roll, or other desired form. The molded mass is then immediately quick-frozen whereupon it may be either removed from the mold as in the case of the metal mold, or sliced with the mold intact in the case of the fiber or plastic casings. The weight of the patty can be controlled by the diameter of the mold and the thickness of the slice. Conventional stuffing machines ordinarily provide products of 2 to 6" in diameter, and loaves of such diameter may be sliced into pieces desirably from ⅛" to 1" thick. A convenient size for packaging and marketing has been found to be 4½" in diameter by ¼" in thickness. Four patties of such size, divided by paper and wrapped and/or placed in cartons, provide the conventional 11½ oz. frozen food package. Alternatively, six patties may be used to make one pound.

A particularly important facet of the present invention is the combination of the use of the small concentrations of "Methocel" in the aqueous solution with which the food products are mixed, combined with the freezing step to retain the patties in the desired attractive shape and size. Without the intermediate freezing step, it would, in most instances, be substantially impossible with the preferred solution concentrations to provide a product of sufficient strength to be formed into a patty and cooked without disintegration. Even a frozen patty formed with a solution of "Methocel" so weak it would not normally form a gel when heated, can be satisfactorily cooked without disintegration on a pan or broiler, or fried in deep fat. This is because the frozen surfaces of the patty in contact with intense heat, due to fast evaporation before the whole patty has thawed, form a supporting gel film which preserves the patty from disintegration, and gradually, while thawing and cooking the remaining solution is sufficiently concentrated to be able to form the gel medium necessary to insure satisfactory cooking. When a frozen patty is placed on a hot pan, the surface in contact with the hot pan is, through a flash evaporation action, almost instantaneously sufficiently evaporated to provide a "Methocel" solution of a concentration which forms a gel under influence of the heat from the pan. Before the whole patty has thawed, the bottom part which is in contact with the hot pan has formed a sufficiently hard gel film to support the whole patty and make it possible to turn it over without breaking up the patty. In the initial step of cooking, the frozen part of the patty supports and holds the patty in shape. After the warming up and thawing, the first-cooked part protects the whole patty from disintegration through the gel film formed in the first-heated surface of the patty.

While it is desirable to retain the patties in frozen form until they are cooked, it has been unexpectedly found that the viscosity of a methyl cellulose solution increases upon freezing and thawing, so that in some instances the thawed patty is sufficiently strong to hold together and retain its shape prior to the cooking operation.

It will be understood that the cooking time depends upon the selected grade and viscosity type of "Methocel," as previously mentioned, and also upon the thickness of the patty and the quantity of solution originally incorporated into the mixture prior to freezing. Thus, a frozen patty containing 70% of hamburger meat and 30% additives including equal parts by weight of water and vegetables, and utilizing U. S. P. grade "Methocel" of 4000 cps., frozen and sliced to ¼" thickness, will require only about 1½ minutes cooking on each side. A longer cooking time may be provided by using larger quantities of "Methocel" solution and/or a lower viscosity type. During the cooking operation, the patty being frozen, water is evaporated from the surface of the patty in contact with the heat, and the "Methocel" solution accordingly becomes more concentrated and with the rise in temperature forms a surface gel framework which holds the patty together during the progressive thawing and cooking of the whole patty. As the interior of the patty thaws and heats up, water is evaporated from the "Methocel" solution in contact with the food particles, changing into steam, which effects a very satisfactory cooking medium for both the meat and vegetable particles. The gel structure formed as the product cooks is sufficiently strong to withstand the steam pressure developed inside the product and provides a frame or network holding the product substantially in its initial shape, resisting the general tendency to disintegrate. This is particularly important where the food particles contain fats or comprise food materials which do not have a natural tendency to adhere to each other. In the final cooked product, the gel characteristics of the "Methocel" have substantially disappeared, but a more or less rigid framework is formed throughout the body of the cooked patty, holding the particles together even after the cooked product has cooled and is served as a cold dish. It has been found that in no instance does the cooking operation, when properly conducted so as not to overcook the food particles, drive off more water than has been added during the initial formation of the product. Thus, where hamburger meat originally containing about 37% moisture has been utilized in the formation of the patty, the final cooked product will contain at least this amount of moisture, thereby being extremely juicy and tasty in comparison with the ordinary cooked hamburger wherein the moisture content has been materially reduced from the original 37% to thereby form a relatively dry, crumbly product. As aforementioned, the loss in moisture during the cooking operation can be controlled by selecting the concentration and viscosity characteristics of the "Methocel" utilized in the initial preparation as well as by controlling the amount of added solution. The invention will be further illustrated by the following examples of practice:

*Example 1*

100 pounds of raw ground hamburger meat are mixed with 20 pounds of a water solution containing 0.25% by weight of "Methocel" U. S. P. grade having a viscosity of 4000 cps. in 2% solution at room temperature. To the resulting mixture, 20 pounds of whole peas (raw or canned) are added and are thoroughly incorporated in the mass. The resulting mass is placed in a stuffing machine and extruded under 3–5 pounds pressure into elongated cylindrical metal molds of 4½" diameter, care being taken to prevent the presence of air in the mold or in the mix. It is noted that the liquid constituents of the mass substantially completely fill the voids between the food particles thereby facilitating removal of air. The mass in the metal molds is then hard-frozen and removed from the molds while still in frozen form and sliced into ¼" patties. These patties, while still frozen, are then packaged in the usual manner for retail sale as a frozen food product.

The process is repeated with solution concentrations of "Methocel" including 0.5, 0.75, 1.0, and 2.0% solutions, in amounts varying between 20 and 50% by weight. All provide satisfactory products which vary slightly with respect to hardness.

*Example 2*

The process of Example 1 is repeated with proportions of 25 pounds of "Methocel" solution and 25 pounds of mixed, chopped fresh vegetables per 100 pounds of ground meat; with 33⅓ pounds of "Methocel" solution and 33⅓ pounds of added vegetables per 100 pounds of ground meat; and with 40 pounds of "Methocel" solution and 40 pounds of added vegetables per 100 pounds of ground meat. In each instance, attractive meat-vegetable patties are obtained which can be quickly cooked, and which are of pleasing consistency and taste.

Any desired beef type may be substituted for the hamburger meat of Examples 1 and 2, and the vegetables can be selected as desired. An all-meat product or an all-vegetable product, as well as combinations thereof, can readily be prepared. With the latter, the solution concentration should be increased to 1.0 to 2.0%.

*Example 3*

100 pounds of shredded, raw chicken are mixed with 20 pounds of an aqueous solution containing 1.00% by weight of cellulose ether ("Methocel" H. G. 65 grade, 15 cps., and "Methocel" H. G. 65 grade 4000 cps. in equal quantities). Twenty pounds of mixed, shredded raw vegetables are incorporated in the resulting mass. The relatively fluid mass is then placed in a stuffing machine, formed into molds, quick-frozen, and sliced into patties. The frozen patties are packaged for market. The resulting chicken-vegetable patties when rapidly cooked are found to be delicious.

The process is repeated with different concentrations and proportions of "Methocel" solution. Solutions containing concentrations of "Methocel" from 0.5 to 2.0% in amounts varying between 20 and 50% by weight with respect to the meat all provide satisfactory chicken or turkey patties.

Example 4

100 pounds of shredded or ground raw shrimp is mixed with 25 pounds of an aqueous solution containing 0.5% of "Methocel" H. G. 90 grade of 4000 cps. viscosity. Twenty-five pounds of chopped, raw vegetables are added and the resulting mass is placed in a stuffing machine, molded into loaf form, frozen, and after removal of the molds, is cut into slices and packaged for market. The resulting frozen "shrimpburgers" cook rapidly and have an excellent consistency and fresh taste characteristic. Where whole shrimp or large lumps are used, or where the shrimp is precooked, the concentration of "Methocel" should be increased to about 2 or 3%. Whole shrimp and large pieces are preferably partially precooked to reduce the cooking time of the resulting patty. Crab meat and lobster, as well as other seafoods, are treated in the same manner as the shrimp. Patties made of seafoods in "Methocel" solution without the addition of vegetables produce an excellent, juicy, all-seafood product.

Starchy materials, such as precooked or partially precooked rice may be used with any of the mixtures disclosed herein, and are especially useful with shrimps and other seafoods. From about 5 to 25% or more of such starchy materials may be used. The more highly viscous solutions of methyl cellulose ether are preferred in such instance. Large amounts of starchy materials in general are avoided because of the tendency of such materials to absorb the methyl cellulose ether solutions—thereby rendering such solutions ineffective for holding the patties together. With the more viscous solutions, the degree of absorption by the starchy materials is lessened. The tendency of the starchy materials to absorb the added methyl cellulose ether solution from the food mixtures may also be substantially lessened by chilling all of the ingredients close to the freezing temperature, i. e. from about 32° F. to about 45° F.

Example 5

100 pounds of whole or lump shrimp are mixed with 20 to 25 pounds of precooked rice. To this mixture is added about 25 pounds of 2% solution of "Methocel" (one-half U. S. P. 7000 cps. and one-half H. G. 90, 4000 cps.). The mass is mixed, placed in molds, frozen, and then cut into patties for packaging and marketing.

Example 6

100 pounds of whole or lump shrimp are mixed with 20 to 25 pounds of precooked rice which has previously been mixed with 10 to 15% of melted butter. To this mixture is added about 25 pounds of 1.25% solution of "Methocel" (one-third U. S. P. 4000 cps., two-thirds H. G. 90, 4000 cps.). The mass is mixed, placed in molds, frozen, and then cut into patties. All ingredients are chilled close to 32° to 35° F. prior to mixing in order to prevent absorption of the "Methocel" solution by the rice. By mixing the melted butter with the rice prior to chilling, homogeneous incorporation of the butter in the mass is obtained, and furthermore the butter acts to coat the rice particles and thereby also lessens the tendency of the rice to absorb the "Methocel" solution.

Example 7

100 pounds of a ground meat mixture consisting of 50% pork and 50% veal are mixed with 25 pounds of an aqueous solution containing 1.25% by weight of cellulose ether ("Methocel" H. G. 65, 15 cps. and "Methocel" H. G. 65, 4000 cps. in equal quantities). 20 pounds of mixed, shredded, raw vegetables are incorporated into the resulting mass. The mass is then placed in a stuffing machine, forced into molds, quick frozen, and sliced into patties. The frozen patties are packaged for market.

Example 8

100 pounds of mixed raw vegetables including small whole lima beans, whole green peas, chopped green beans, celery, and corn are mixed with 25 pounds of a 2.0% solution of "Methocel" U. S. P. grade, 4000 cps. viscosity. The resulting mixture is stuffed into molds, quick-frozen, removed from the molds and then sliced. The resulting patties in frozen form are then packaged for market. These all-vegetable "burgers" upon cooking provide an attractive and tasty vegetable dish.

Example 9

100 pounds of shredded raw turkey or chicken are mixed with 30 pounds of a 1% solution of "Methocel" (H. G. grade, of 4000 cps. and H. G. 90 of 50 cps. in equal proportions). The resulting mass is stuffed into molds, quick-frozen, removed from the molds, and sliced into patties of ⅜" thickness. The patties are packaged for market.

These all turkey or all-chicken patties when cooked retain their shape while served, but are tender and juicy and have an attractive fresh food taste.

Example 10

A fruit mixture is prepared as follows:

|  | Percent |
|---|---|
| Chopped fresh apples | 65 |
| Sliced bananas | 10 |
| Crushed pineapple | 10 |
| Raisins | 5 |
| Shredded dried apricots | 5 |
| Sugar | 5 |

The foregoing fruit mixture is admixed with 30% by weight of a 3% solution of "Methocel" (½ U. S. P., 4000 cps.—½ H. G. 60, 4000 cps.). The resulting mass is placed in molds, frozen, removed from the molds and sliced into patties ¼ to ½ inch in thickness as desired. The frozen patties are packaged for market. They are adapted to be cooked for about 3 or 4 minutes on each side, and provide delicious, juicy, cooked fruit patties.

If desired, other fruits may be substituted for those given in the illustrative formula. Nuts may be incorporated in the admixture. From 5 to 10 percent by weight of starch or flour can be added if a more dense product is desired. In some instances, considerably larger quantities of starchy material may be used.

It will be understood that in all the foregoing mixtures flavorings, shortening, and condiments may be added to taste during the initial mixing, and prior to freezing.

The foregoing process provides a ready means for selecting various vegetables and/or meats to provide patties tailored for all classes of consumers. Thus, meat-vegetable patties provide a convenient means for enticing children to consume the vegetable constituents regarded as essential to good health. Shrimp, crab, or lobster and other safoods are quickly and economically provided for special occasions. A patty containing all of the essential ingredients for a balanced diet may be readily provided. A dietary food can be provided for special purposes and for use by vegetarians. Due to the amount of moisture present in the frozen product, it is not necessary to add fat to the pan or griddle for the cooking of the patties. It is preferable, however, in such instances to prepare the products with the higher gelling grades of "Methocel" so as to prevent such rapid gel formation on the surface of the patty as to result in scorching or sticking.

It will be understood that the present process using the combined low-concentration "Methocel" solution and freezing step is especially useful in making patties from such food products as meat, chicken, turkey, vegetables, and seafood, or any mixture of these. It is possible in some instances to produce meat patties from hamburger meat or the like by adding small quantities of a low-viscosity solution of "Methocel" and making the same into patties with a patty making machine prior to the freezing operation. With other food products, however, use of the conventional patty making machine is generally unsatisfactory.

It will be understood that the proportions set forth in the foregoing examples may be varied in a manner which will be readily apparent to those skilled in the art, generally between the limits broadly set forth.

I claim:

1. The method of preparing frozen food products adapted to be cooked, comprising: mixing food particles with from about 10 to about 100 percent by weight of a non-gelled aqueous solution of an edible colloid which forms solutions that gel on heating and which gel-forming characteristics are not affected by freezing and subsequent thawing, to thereby provide a gel-forming cooking and binding medium for said particles, and freezing the admixture of food particles and edible colloid solution prior to said cooking operation so that the food particles are initially held together by the frozen colloid solution.

2. The method of preparing a food product, comprising: mixing food particles selected from the group consisting of meats, seafoods, vegetables, fruits, and combinations thereof, with from about 10 to about 100 percent by weight of an aqueous solution of methyl cellulose which forms solutions that gel on heating and which gel-forming characteristics are not affected by freezing and subsequent thawing, to provide a gel-forming, cooking and binding medium for said food products during a subsequent cooking operation, and freezing the admixture of food particles and methyl cellulose solution prior to said cooking operation so that the food particles are initially held together by the frozen methyl cellulose solution.

3. The method as defined in claim 2, wherein the food particles comprise both meat and vegetable particles.

4. The method of claim 2, wherein the food particles comprise raw meat particles.

5. The method of claim 2, wherein the food particles comprise raw vegetable particles.

6. The method of preparing frozen food patties adapted to be cooked without substantial change in shape, comprising: admixing food particles selected from the group consisting of meats, seafoods, vegetables, fruits, and combinations thereof, with from about 10 to about 100 percent by weight of a fluid aqueous solution of an edible cellulose ether which forms solutions which gel on heating and which gel-forming characteristics are not affected by freezing and subsequent thawing, to thereby provide a gel-forming, cooking and binding medium for said particles, and shaping and freezing the resultant mass to provide frozen patties, the quantity of cellulose ether provided by said solution being sufficient to retain the pieces in patty form during a subsequent cooking operation.

7. The method of preparing frozen food patties adapted to be cooked without substantial change in shape, comprising: admixing food particles with from about 10 to about 100 percent by weight of a fluid aqueous solution of an edible cellulose ether which forms solutions that gel on heating and which gel-forming characteristics are not affected by freezing and subsequent thawing, to thereby provide a gel-forming, cooking and binding medium for said particles, freezing the resulting mass, and cutting the frozen mass into patties, the quantity of cellulose ether provided by said solution being sufficient to retain the pieces in patty form during a subsequent cooking operation.

8. The method of preparing a cooked food product, comprising: admixing food particles with from about 10 to about 100 percent by weight of a fluid aqueous solution of an edible cellulose ether which forms solutions that gel on heating and which gel-forming characteristics are not affected by freezing and subsequent thawing, to thereby provide a gel-forming, cooking and binding medium for said particles, shaping and freezing the resulting mass to provide frozen pieces, and cooking said frozen pieces by direct application of heat to the surface thereof, the quantity of cellulose ether provided by said solution being sufficient to provide a surface film on said pieces upon initial application of heat and evaporation of moisture from the surface to which the heat is applied, said film retaining the pieces in integral form during completion of the cooking operation.

9. The method of preparing a frozen food product adapted to be cooked without substantial change in shape, comprising: admixing food particles selected from the group consisting of meats, seafood, vegetables, fruits, and combinations thereof, with from about 10 to about 100 percent by weight of a fluid aqueous solution of methyl cellulose which form solutions that gel on heating and which gel-forming characteristics are not affected by freezing and subsequent thawing, to thereby provide a gel-forming, cooking and binding medium for said particles, and shaping and freezing the resulting mass to provide frozen patties, the quantity and concentration of said solution of methyl cellulose being such that the frozen product contains no more about 2 percent by weight of methyl cellulose.

10. The method of preparing a cooked food product, comprising: admixing food particles selected from the group consisting of meats, seafood, vegetables, fruits, and combinations thereof with from about 10 to about 100 percent by weight of a fluid aqueous solution of methyl cellulose which forms solutions that gel on heating and which gel-forming characteristics are not affected by freezing and subsequent thawing, to thereby provide a gel-forming, cooking and binding medium for said particles, and shaping and freezing the resulting mass to provide frozen patties, and cooking said frozen patties by direct application of heat to the surfaces thereof, the quantity and concentration of said solution of methyl cellulose being sufficient to provide a methyl cellulose film through evaporative and heat action during the cooking operation to hold the pieces in patty form but being no more than about 2 percent by weight with respect to the cooked product.

11. The method of preparing a frozen food product adapted to be cooked without substantial change in shape, comprising: admixing food particles selected from the group consisting of meats, seafoods, vegetables, fruits, and combinations thereof, with from about 10 to about 100 percent by weight of a fluid aqueous solution of methyl cellulose which forms solutions that gel on heating and which gel-forming characteristics are not affected by freezing and subsequent thawing, to thereby provide a gel-forming, cooking and binding medium for said particles, and placing the resulting mass in a mold, freezing the mass in said mold, removing the frozen mass from the mold and cutting said frozen mass into patties, the quantity and concentration of said solution of methyl cellulose being such that the frozen product contains no more than about 2 percent by weight of the methyl cellulose.

12. The method of preparing a food product adapted to be cooked without substantial change in shape, comprising: admixing food particles selected from the group consisting of meats, seafoods, vegetables, fruits, and combinations thereof, with from about 10 to about 100 percent by weight of a fluid aqueous solution of methyl cellulose which forms solutions that gel on heating and which gel-forming characteristics are not affected by freezing and susbequent thawing, to thereby provide a gel-forming, cooking and binding medium for said particles, the concentration of said solution being insufficient to provide gel formation by temperature rise alone, freezing the resulting mass, cutting the frozen mass into patties, and cooking the frozen patties by direct application of heat to the frozen surfaces so that a gel film is immediately formed on said surfaces by the combined action of heat and solution evaporation, said film holding the food particles in patty form during the completion of the thawing and cooking operation.

13. A frozen food product produced by the process of claim 1.

14. A frozen food product produced by the process of claim 1 wherein the food particles comprise poultry meat.

15. A frozen food product produced by the process of claim 1 wherein the food particles comprise vegetables.

16. A frozen food product produced by the process of claim 1 wherein the food particles comprise seafood.

17. A frozen food product produced by the process of claim 1 wherein the food particles comprise fruit.

References Cited in the file of this patent

UNITED STATES PATENTS

| | | |
|---|---|---|
| 1,864,285 | Taylor | June 21, 1932 |
| 1,943,374 | Dreyfus | Jan. 16, 1934 |
| 2,302,511 | Wallach | Nov. 17, 1942 |
| 2,496,278 | Eddy | Feb. 7, 1950 |
| 2,640,779 | George | June 2, 1953 |
| 2,650,167 | Garsaud | Aug. 25, 1953 |
| 2,721,142 | Shinn et al. | Oct. 18, 1955 |

FOREIGN PATENTS

| | | |
|---|---|---|
| 566,764 | Great Britain | Jan. 12, 1945 |